United States Patent [19]

Coudeyre et al.

[11] 4,244,391

[45] Jan. 13, 1981

[54] PNEUMATIC PROGRAM REGISTER AND CORRESPONDING MODULE

[75] Inventors: Jacques Coudeyre, Tournon; Claude Guidot, Saint-Peray, both of France

[73] Assignee: Crouzet, Paris, France

[21] Appl. No.: 842,098

[22] Filed: Oct. 14, 1977

[30] Foreign Application Priority Data

Oct. 20, 1976 [FR] France ................................ 76 31654

[51] Int. Cl.³ .......................................... G05D 16/04
[52] U.S. Cl. ................................ 137/119; 137/624.18; 235/201 ME
[58] Field of Search ....................... 137/624.11, 624.18, 137/624.2, 119; 235/201 ME

[56] References Cited

U.S. PATENT DOCUMENTS 3,875,959  4/1975  Bouteille .................. 235/201 ME X Primary Examiner—Alan Cohan
Attorney, Agent, or Firm—Holman & Stern

[57] ABSTRACT

A pneumatic program register comprising a plurality of sequential by cascaded modules, each module comprising a pneumatic flip-flop, an AND cell with two inputs and an OR cell with two inputs, one input of said OR cell being connected with the output of said flip-flop of same module, said output of said flip-flop being also connected with one of the inputs of said AND cell of same module, the other input of said OR cell being connected, on the one hand, with the output of the OR cell of the following sequential module, so that the OR cells of all sequential modules are connected in series, and, on the other hand, with the reset port of said flip-flop of the same module, the trigger input of said flip-flop being connected with the output of the AND cell of the preceding sequential module.

4 Claims, 3 Drawing Figures

PNEUMATIC PROGRAM REGISTER AND CORRESPONDING MODULE

BACKGROUND OF THE INVENTION

The present invention relates to a pneumatic program register for sequence automatic controls such as those used in industry, comprising flip-flops and logic elements interconnected to each other.

In the known sequence automatic controls of this type, a succession of pneumatic flip-flops and AND logic cells alternately connected in series provide a succession of distinct sequences, or sequential modules, each sequence being triggered by the output signal from the preceding flip-flop and by an externally derived feedback signal indicative of the execution and the end of the operation corresponding to the preceding sequence. Practically, for providing a zero-setting of the assembly, there is added to each couple which is formed by a flip-flop and an AND logic cell, an OR cell receiving on one input the signal from a general zero-setting line and on the other input the output signal from the storage relay of the downstream sequence in order to achieve successive resets of the stores while the sequences are in progression. Such reset operation is necessary for the correct execution of a program.

SUMMARY OF THE INVENTION

It is an object of the invention to increase the reliability of this operation. To that end, this reset signal is maintained not only during the duration of the downstream sequence, but also during all the following sequences till the end of the program.

For this purpose, the pneumatic program register of the invention, which comprises in a manner known per se a module having flip-flops, AND cells with two inputs and OR cells with two inputs, is characterized in that each OR cell has one of its inputs connected with the output of the store of same sequential module or level, and its other input connected on the one hand with the output of the OR cell of the downstream, module or sequence and on the other hand with the store reset port of the same sequential level.

However, for a zero reset of the register, a supplementary OR cell has to be provided outside the register, receiving on one input the signal from a zero-setting duct, and on the other input the signal for the end of the last operation of the register. Such an arrangement provides also the possibility of forming a register even if it comprises less than three stages or sequences.

The invention will become more apparent from the following detailed description of one preferred embodiment thereof when taken in conjunction with the accompanying drawings, wherein:

DESCRIPTION OF A PREFERRED EMBODIMENT

Figure 1:
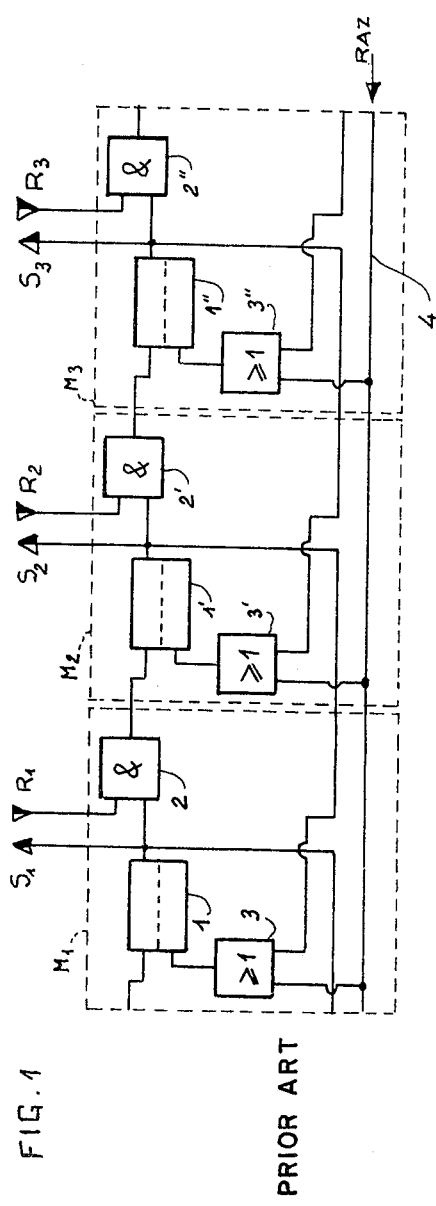
FIG. 1 is a block diagram of a conventional pneumatic register of the prior art.

As illustrated in FIG. 1, a program register of the prior art comprises pneumatic flip-flops $1$, $1'$, $1''$ etc..., associated with AND gate cells $2$, $2'$, $2''$ ... and OR gate cells $3$, $3'$, $3''$ ..., in such manner that each OR cell may receive either the signal from a zero-setting line 4, or the output signal $S_2$, for the OR gate cell 3, from the flip-flop of the downstream sequence. Such an arrangement does not provide the possibility of forming registers with less than three sequences, and the zero-setting of each flip-flop is ensured only by the temporary signal from the following (downstream) sequence. Generally, the various elements of such registers are gathered in elementary modules $M_1$, $M_2$, $M_3$ ... connected on a connecting base, each module being not triggered unless it receives an externally derived feedback signal $R_1$, $R_2$, $R_3$ ..., indicative of the execution and the end of the operation corresponding to the preceding module.

Figure 2:
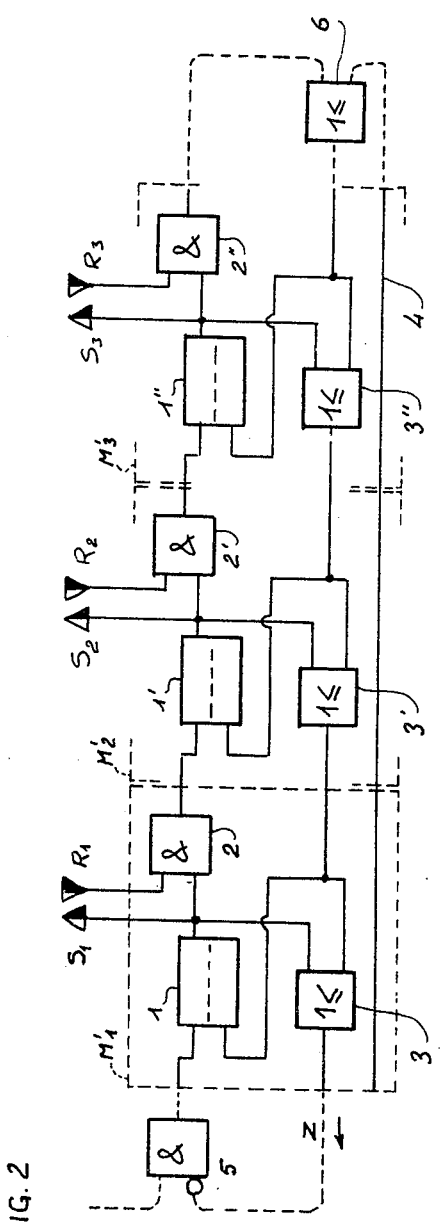
FIG. 2 is a block diagram of a register according to the invention.

In FIG. 2, which is a block diagram of the register according to the invention, the various modules $M'_1$, $M'_2$, $M'_3$ ... are provided with different internal connections, arranged in such manner that each OR gate cell $3$, $3'$, $3''$ ... receives on its inputs, on the one hand the signal corresponding to the output from the flip-flop of the same sequence and, on the other hand, the output signal from all the following OR cells which are connected in series. Another OR gate cell 6, mounted outside the register, allows a zero-setting at any moment of the register assembly by means of a zero-setting line 4. A NO cell 5, mounted at the input of the register, provides the resetting of the assembly. The use of the latter cell may be avoided by utilizing flip-flops with priority reset.

In such a type of register, there appears, as soon as it is set, a z signal lasting until the cycle is completely finished, which provides the advantage of an easy insertion in a larger overall automatic assembly.

Figure 3:
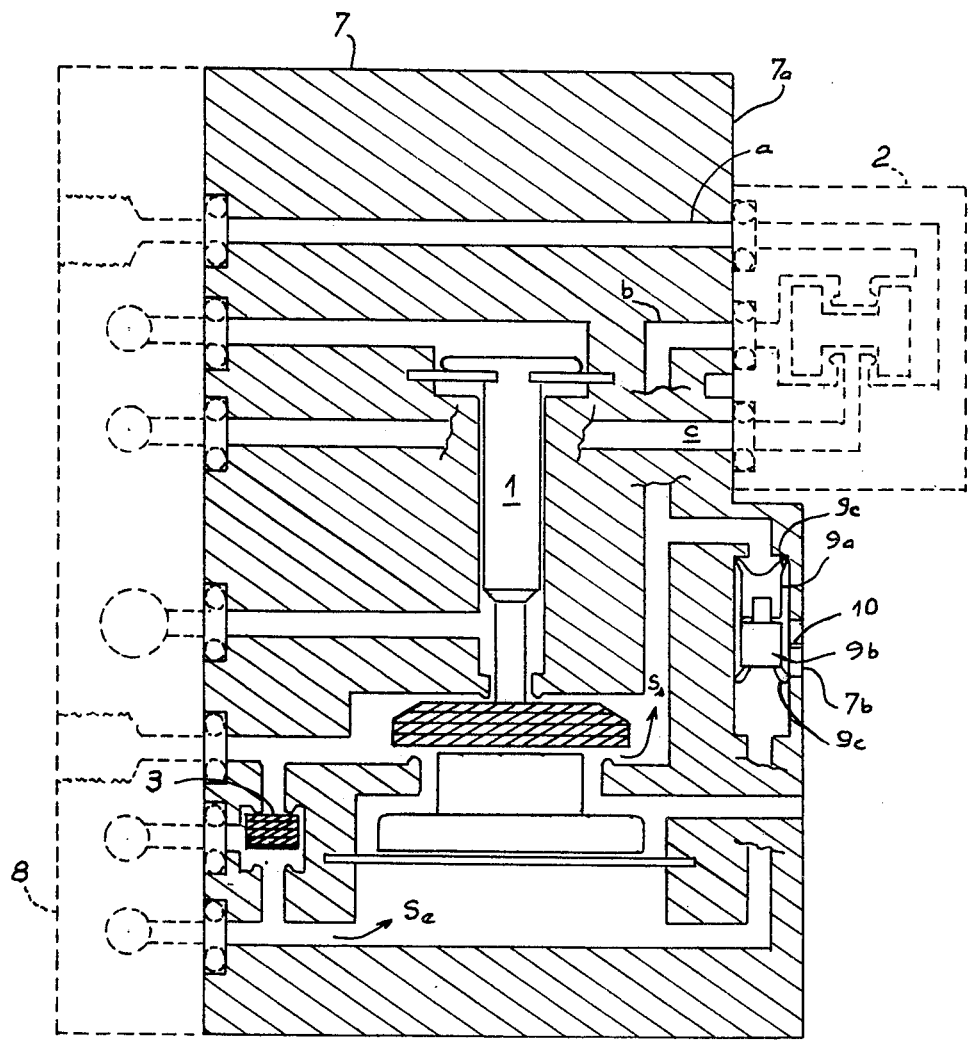
FIG. 3 shows a pneumatic module for forming the register of FIG. 2.

In practice, each module of the register according to the invention, shown in FIG. 3, comprises a storage relay 1, with priority reset, or not, and an OR gate cell 3 inside module body 7, while an AND gate cell 2 is connected on a fixing-plane $7a$ upon which emerge three ducts a, b, c, thereby allowing its easy replacement by other peripheral elements also adaptable on said fixing-plane $7a$, such as: a pressure drop sensor, a delay and time element with positive output, a relay for a leakage detector, amplifiers, manostats. This module is adapted to be connected to a base 8 comprising the various fluid ducts, two of which, a and c, communicate directly through the body 7 of the module with the fixing-plane $7a$, while the third duct b of said fixing-plane receives the output signal $S_s$ of the flip-flop 1. Moreover, this module comprises a storage indicator made of a two-colour piston, comprising two portions $9a$ and $9b$, which moves in front of a transparent window $7b$.

The importance of this indicator lies in that it keeps its state when there is an air cut-off in the supply of register, thereby allowing the service personnel to spot the sequence which was running when the cut-off occured. For this purpose, this indicator is moved in one direction by the output signal $S_s$ of the sequence, and in the other direction by the reset signal $S_e$ of the sequence. The friction of lips $9c$ of piston $9a$, $9b$ provides the storage effect. A small port 10 directs eventual leakages towards the open air without effect on the operation of the module.

The device which is the object of the invention is particularly adaptable for making program registers with varied functions from a basic elementary module designed for achieving greater operational reliability due to the reset signal until an automatic cycle is completely finished.

What we claim is:

1. A pneumatic program register comprising a plurality of sequential modules, each module comprising a pneumatic flip-flop having a trigger input, a reset part and an output, an AND cell with two inputs and an output and an OR cell with two inputs and an output, one input of said OR cell being connected with the output of said flip-flop of the same module, said output of said flip-flop being also connected with one of the inputs of said AND cell of the same module, the other input of said OR cell being connected, on the one hand, with the output of the OR cell of the following sequential module, so that the OR cells of all sequential modules are connected in series, and, on the other hand, with the reset port of said flip-flop of the same module, the trigger input of said flip-flop being connected with the output of the AND cell of the preceding sequential module.

2. A pneumatic program register as in claim 1, wherein said flip-flops are priority reset storage flip-flops.

3. In a pneumatic program register as in claim 1, said sequential module being further characterized by said flip-flop and OR cell being disposed within a module body provided with a first connecting face so that said body can be secured to a connecting base, a second connecting face being provided on said module body for securing said AND cell thereto, said AND cell communicating with said module body through three ports provided on said second connecting face, two of said three ports being directly connected through two fluid ducts with two other ports, respectively, provided on said first connecting face, the third port of said second connecting face being in communication with the output of said flip-flop through a third fluid duct.

4. A sequential module as in claim 3, wherein a storage indicator, provided within said module body, is connected between the output and the erasion port of said storage relay, said indicator being made of a two colour piston displaceable in front of a transparent window provided on the module body, said piston being displaced in one direction by the output signal of said storage relay, and in the other direction by the erasion signal of same storage relay.

* * * * *